United States Patent [19]
Skutt

[11] 3,801,862
[45] Apr. 2, 1974

[54] PLASMA CELL VOLTAGE CONTROL CIRCUIT

[75] Inventor: Robert R. Skutt, Kettering, Ohio

[73] Assignee: The National Cash Register Company, Dayton, Ohio

[22] Filed: Nov. 6, 1972

[21] Appl. No.: 303,834

[52] U.S. Cl. ........ 315/169 TV, 313/109.5, 315/270
[51] Int. Cl. ............................................. H05b 41/16
[58] Field of Search.......... 315/169 TV, 169 T, 270, 315/271; 313/109.5, 107.5

[56] References Cited
UNITED STATES PATENTS
3,614,769   10/1971   Coleman .................. 315/169 TV X
3,600,631   8/1971    Cake .......................... 315/169 T X
3,227,922   1/1966    Glaser et al.................. 313/109.5 X
2,906,906   9/1959    McCauley et al................ 313/109.5

Primary Examiner—Alfred L. Brody
Attorney, Agent, or Firm—J. T. Cavender; Albert L. Sessler, Jr.; Edward Dugas

[57] ABSTRACT

The present circuit controls the width of the voltage pulses applied to a plasma cell to control the amount of wall charge that builds within the cell. By controlling the level of the wall charge it is possible to control the occurrence of the discharge within the cell.

7 Claims, 8 Drawing Figures

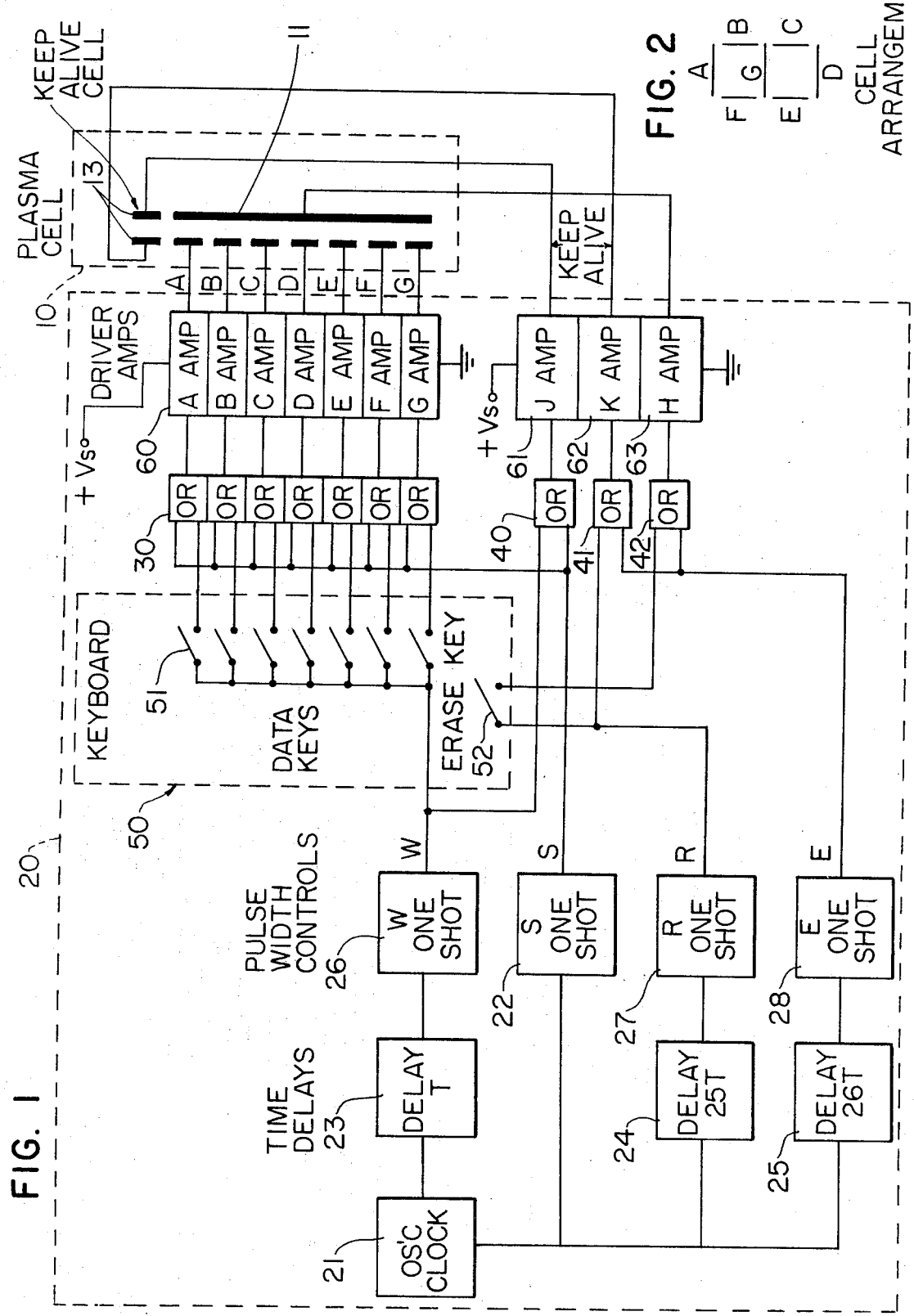

PLASMA CELL VOLTAGE CONTROL CIRCUIT

BACKGROUND OF THE INVENTION

Plasma (gaseous) displays utilizing the phenomenon of wall charge have been used in the past. In Great Britain Pat. No. 1,161,832 entitled "Gaseous Display and Memory Apparatus" there is disclosed a plasma gas cell having electrodes which are insulated from the gas, and which electrodes are connected to a source of pulsing discharge signals for forming a wall charge in the cell. The presence or absence of the wall charge inparts information similar to a memory. For example when the wall charge is present within the cell it is possible to cause a discharge in the gas using a potential having a level as low as one-half of the level required to cause a discharge in the absence of a wall charge. Interrogation of the cell with a potential level equal to one-half the level required for a discharge, or a level slightly less than the level of the potential used to form a wall charge, will cause the cell to discharge if the wall charge is present and not to discharge if it is not present.

In the referenced patent the existence or non-existence of a wall charge is the information element. The present application is directed to a circuit for controlling the level of formed wall charge by utilizing a pulse width circuit to vary the pulse width between different finite increments of width so as to control the formation time allowed to the wall charge during each cycle of pulses applied across a cell. When the level of the wall charge is added to the applied pulsed signal a discharge will occur if the sum of the levels is above the ionization potential level of the gas used in the cell. If the cell is in a discharge condition and the level of the wall charge as added to the applied pulse signal is not below the extinguishing level of the cell the discharge will continue to exist. Once the level of the combined wall charge and applied pulsed signal falls below the extinguishing level of the cell the discharge ceases until the firing level is again exceeded.

SUMMARY OF THE INVENTION

In the present invention the amount of wall charge which is allowed to form within a plasma gas cell is controlled by controlling the pulse width of the signals applied to the cell electrodes.

In the preferred embodiment of the present invention there is provided a clock source for providing a train of pulses, which train of pulses are fed to a plurality of delay means for delaying the pulsed signals for time periods corresponding to the width of the pulsed signals. A combining means combines selected delayed pulse signals with the provided pulse signals to form a composite pulse signal having the desired pulse width. Means are provided for applying the combined signals first to one electrode of the plasma gas cell and then to the other electrode. When the combined signal is not being applied to an electrode the electrode is maintained at a ground potential. A keep-alive cell, wherein a continuous discharge is taking place is placed in coupling proximity to the gas of the plasma cell to provide ionized particles. A plurality of plasma cells can be used with switches selecting which cells are to receive the composite pulsed signals for causing a plasma discharge to occur in the cell.

From the foregoing it can be seen that a primary object of the present invention is to provide an improved means for controlling the discharge within a plasma gas cell.

It is a further object of the present invention to provide a means for controlling the magnitude of a wall charge within a plasma gas cell.

It is another object of the present invention to provide a circuit for a digital pulse width control of the discharge in a plasma gas cell.

These and other objects of the present invention will become more apparent when taken in conjunction with the following description and drawings, wherein like numbers indicate like parts and which drawings form a part of the present invention.

BRIEF DESCRIPTION OF THE DRAWINGS

FIG. 1 is a block schematic diagram of the preferred embodiment of the present invention;

FIG. 2 is a schematic representation of the cell electrode configuration used in the embodiment of FIG. 1;

DISCLOSURE OF THE INVENTION

Figure 4A:
FIGS. 4a to 4c are wave forms useful in understanding the operation of the embodiment shown in FIG. 1.

In FIG. 1 a single character plasma gas display device 10 is shown connected to the discharge control circuit 20 of the present invention. The plasma cell can be of the type shown in U.S. Pat. No. 3,614,769 entitled "Full Select-Half Select Plasma Display Driver Control," by William E. Coleman et al., which patent is assigned to The National Cash Register Company of Maryland, the Assignee of the present application. The single character plasma display device is shown comprised of a common electrode 11 and seven individual electrodes, A to G, spaced from the common electrode. The combination of an individual electrode and the common electrode will be called a cell. In the preferred embodiment the individual electrodes are positioned in the alpha-numeric configuration shown in FIG. 2. A plasma gas occupies the space between the electrodes and each of the electrodes is conductively insulated from the gas. When an ionizing potential is applied across the common electrode and an individual electrode a discharge takes place between the electrodes which discharge allows a charge to build on the dielectric covering the concerned electrodes. The charge is of such a polarity as to oppose the applied potential thereby causing the effective potential across the gas to decrease in value below the level that would sustain a discharge. The sustaining potential level is substantially lower than the ionizing level, provided that it is of the same polarity as the previously established wall charge. Therefore once a discharge takes place the potential necessary to maintain that discharge will be less than the potential necessary to start it. To maintain a discharge in the face of a wall charge it is necessary to alternate the potential as applied to the electrodes. In this alternating (reversing) process the wall charge is added to the applied potential to achieve the ionizing potential. When the applied potential is reversed the wall charge decreases from its former value and starts to build in the opposite direction. By controlling the time period (width) of the applied potentials across the electrodes it is possible to control the magnitude to which the wall charge may build such that on the next cycle of reversing applied potentials the sum of the wall charge and the applied potential does not reach a sufficient level to cause or sustain a discharge. On the other hand control can be such as to allow the summed potentials to exceed the discharge potential to achieve a discharge or to maintain one. The width and magnitude of the applied electrode potential which will cause a discharge is a function of the gas pressure, mixture and physical characteristics of the cell. Typically the gas is a mixture of neon, nitrogen, and argon.

To insure the presence of ionized particles in the vicinity of a selected cell there is provided in the plasma device a keep-alive cell comprised of the two electrodes 13. Sustaining potentials are continuously applied in an alternating cycle across the keep-alive electrodes during the operation of the device. Although only a single character display is shown it will be obvious that a multi-character display could be operated in a similar manner utilizing the teachings of the aforementioned assigned patent and the present application.

Figure 3A:
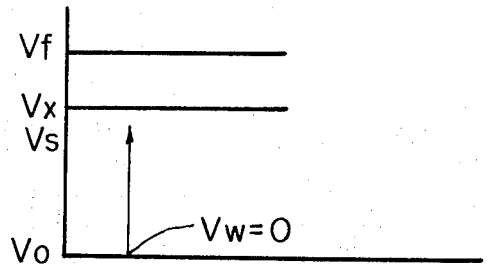
FIGS. 3a to 3c are graphs illustrating operating conditions for a plasma cell.

Referring to FIG. 3a the voltage level $V_F$ denotes the potential level above which a plasma cell fires. A potential above the lower level labeled $V_X$ but below the level $V_F$ will sustain the cell in a discharged condition but will not initially cause a discharge. The level labeled $V_X$ is the level below which the cell is extinguished. In FIG. 3a the potential level of the pulses applied to the electrodes is set at $V_s$. Initially the potential differential appearing across the common electrode and an individual electrode is limited to the level of the applied potential, that is $V_s$. At that point in time the wall charge in the cell is equal to zero. Because the keep-alive cell, once discharged, is continually in operation there is available near the common and independent electrodes a plurality of ionized particles. The potential $V_s$ acts on these particles to start a wall charge build up on opposing surfaces of the cell. Alternating the application of $V_s$ first to the independent electrodes and then to the common electrodes causes the previously formed wall charge to be added to the potential $V_s$. Continued application of the $V_s$ pulses forces the wall charge to reach a level of sufficient magnitude such that combining it with the level of the $V_s$ pulses results in a potential level that exceeds the firing level for the cell.

Figure 3B:
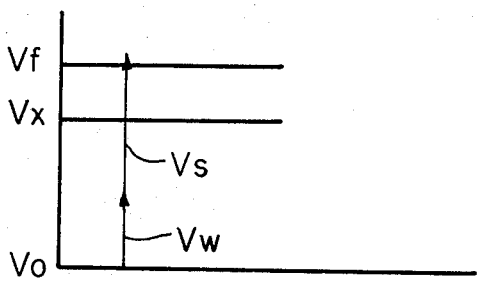

This condition is shown in FIG. 3b. Once the cell has been discharged the potential necessary to maintain the discharge is less than the firing potential. This being the case the wall charge can be reduced to a level which just maintains the combination of potentials above the extinguishing level $V_X$.

Figure 3C:
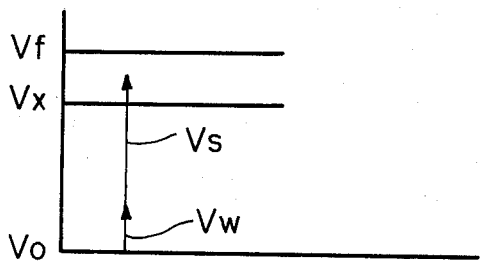

The charts of FIGS. 3a, 3b and 3c are typical, specific values not being given because of variations in the values caused by the physical configuration of the plasma cell, the composition of the gas, the gas pressure and the pulse repetition rate of the oscillator clock. Once the cell has been constructed, the voltage levels at which the cell fires and extinguishes for a given pulse width can be simply determined by experimentation.

Now referring back to FIG. 1 and specifically to the control circuit 20; an oscillator clock 21 provides a train of pulses having a repetition rate of approximately 50 microseconds. The train of pulses is fed undelayed to a one shot multi-vibrator 22, the output of which is a pulse designated S having a pulse width of approximately 0.5 microsecond. The train of pulses is also fed to the delay circuits 23, 24 and 25 for corresponding delays of T, 25T and 26T, where the time T is equal to 0.5 microsecond. The output pulses from the delay circuits 23, 24 and 25 are fed to the inputs of one shot multi-vibrators 26, 27 and 28, respectively. The output pulses W, R and E from the multi-vibrators also have a width of 0.5 microsecond.

The undelayed pulses S are fed as one input to the bank of OR gates 30 and to the input of the keep-alive OR gate 40. The delayed pulses W are fed as the other input to the bank of OR gates 30 through keyboard 50, comprised of data keys controlling switches 51.

The delayed pulses W are also fed as the other input to OR gate 40. The delayed pulses R are fed as an input to OR gate 41, and through an erase key (when activated) to the input of an OR gate 42. The delayed pulses E are fed as inputs to OR gates 41 and 42.

The bank of OR gates 30 correspond in number to the number of individual electrodes, in this case A to G. Data key switches 51 also correspond in number to the individual electrodes with one key switch and one OR gate being assigned to a specific electrode.

Driver amplifiers 60 operate to apply a potential $+V_s$ to an associated individual electrode upon receipt of a pulse signal from a respective OR gate and in all other states to apply a ground, or other reference potential to the individual electrode.

The driver amplifiers 61 and 62, connected to OR gates 40 and 41 respectively, have their outputs connected across the pair of keep-alive electrodes 13.

The driver amplifier 63 has its output connected to the common terminal 11 and its input connected to the output of the OR gate 42. Driver amplifiers 61, 62 and 63 operate in an identical manner to the driver amplifiers of bank 60.

Figure 4B:
Figure 4C:
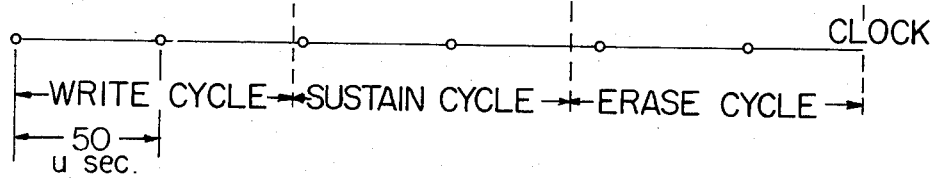

Referring to FIG. 4a, 4b and 4c in conjunction with the circuits of FIG. 1, the output clock pulses from oscillator 21 are shown in FIG. 4c having a repetition rate of 50 microseconds. During the write cycle the pulses SW are applied to the selected individual electrodes and the pulses RE are applied to the common electrode. The width of the pulses shown in FIGS. 4a and 4b are exaggerated; in reality they are each only 0.5 microsecond in width as compared to the clock pulse spacing of 50 microseconds. The combined pulses having the width of 1 microsecond applied alternately to both the selected individual electrodes and the common electrode will cause a discharge to take place between the selected individual electrodes and the common electrode. The relatively long pulse width time allows the wall charge to build to a high enough value to allow for the substitution of a sustaining pulse width signal to the electrodes in place of the wider discharge pulses. The keep-alive electrodes 13 continually receive the combined SW and RE pulses so a discharge continually exists in the area surrounding the keep-alive electrodes which area is made to extend to the area of the individual and common electrodes.

Once the discharge (or entrance of data) takes place due to the depression of selected ones of the keys associated with the switches 51 the selected cell can be switched to a sustain cycle. This takes place when the selected switches 51 are opened. With switches 51 opened the W pulses are not applied to the individual electrodes. The remaining S pulses on the individual electrodes have a pulse width of 0.5 microsecond which is sufficient to maintain the discharge when coupled to the 1 microsecond width pulses RE applied to the common electrode.

In the erase cycle the key associated with the switch 52 is depressed, opening said switch and stopping the application of pulses R to the common electrode. The alternate application of E and S pulses to the individual and common electrodes results in an insufficient build up of the wall charge and the discharges cease.

Although the present invention has been described in terms of a preferred embodiment it would be obvious to a person skilled in the art to extend the one character embodiment shown to a multi-character, multi-line display controller using the pulse width teachings of the present invention. It will also be obvious that many changes and modifications may be made in the present invention without departing from the essential spirit of the invention. It is intended, therefore, in the annexed claims to cover all such changes and modifications that fall within the true scope of the invention.

What is claimed is:

1. A discharge control circuit for use with a plasma gas cell of the type having a pair of insulated electrodes positioned within the cell comprising in combination:

a source of voltage pulses;
   means for connecting said voltage pulses across said pair of electrodes in a reversing cycle; and
   means for varying the pulse width of said pulses between different finite increments so as to vary the magnitude of the wall charge formed within said cell to thereby control the plasma discharge between said pair of insulated electrodes.

2. A discharge control circuit for use with a plasma gas cell of the type having a pair of electrode means conductively isolated from the plasma gas, comprising in combination:

means for providing pulsed signals;
   means for varying between different finite increments of the effective width of said pulsed signals so as to control the magnitude of the wall charges formed in said cell; and
   means for applying said pulsed signals to said pair of electrode means.

3. A discharge control circuit for use with a plasma gas cell of the type having at least a pair of insulated electrode means conductively isolated from the plasma gas, comprising in combination:

a variable pulse width signal source;
   means for applying pulsed signals from said source across pairs of said electrode means; and
   means connected to said signal source for varying the width of the pulsed signals from said source between different finite increments so as to control the magnitude of the wall charge developed in said cell.

4. A circuit for controlling the occurrence of a discharge in a plasma gas cell of the type having insulated electrodes positioned within the cell, comprising in combination:

a source ov voltage pulses;
   means for alternately applying said voltage pulses across said electrodes; and
   means for varying individually the pulse width of said voltage pulses applied alternately to said electrodes between different finite increments so as to control the magnitude of the wall charge formed within said cell, thereby controlling the occurrence of a plasma discharge.

5. In combination:

a plasma gas cell;
   a common electrode positioned in proximity to the plasma gas of said cell;
   a plurality of independent electrodes positioned in proximity to the plasma gas of said cell and opposing said common electrode;
   keep-alive means for maintaining a plasma discharge in at least one area of said plasma gas cell;
   a variable pulse width signal source;
   a plurality of switch means for independently connecting the pulsed signals from said source to said plurality of independent electrodes;
   means for delaying the pulsed signals from said source;
   means for applying the delayed pulsed signals from said source to said common electrode; and
   means for selectively varying the pulse width of the pulse signals from said signal source so as to control the magnitude of the wall charge developed in said cell between the selected electrodes and said common electrode.

6. In combination:

a plasma gas cell;
   a common electrode positioned in proximity to the plasma gas of said cell;
   a plurality of independent electrodes positioned in proximity to the plasma gas of said cell and opposing said common electrode;
   keep-alive means for maintaining a plasma discharge in at least one area of said plasma gas cell;
   a source of pulsed signals;
   means for delaying said pulsed signals for time periods corresponding to the widths of said pulsed signals;
   a plurality of gate means for receiving said undelayed pulsed signals and for applying said signals to said plurality of independent electrodes;
   a plurality of independent switch means for connecting a delayed pulse signal to an input of said gate means so as to cause a pulse signal of increased width to be applied to selected independent electrodes;
   gate means for receiving at least two additionally delayed pulsed signals from said delay means and for feeding the combined signal to said common electrode; and
   switch means interposed in the path between one of said additional delayed pulsed signals and said gate means for discontinuing the application of one of the delayed pulsed signals to said common electrode so as to cause an erasure of discharges between said independent electrodes and said common electrodes when said independent switch means are not connecting a delayed pulse to a gate means.

7. A discharge control circuit for use with a plasma gas cell of the type having at least a pair of insulated electrode means conductively isolated from the plasma gas, comprising in combination:

a variable pulse width signal source;
   means for applying pulsed signals from said source across pairs of said electrode means;

a plurality of delay means for receiving said pulsed signals and for delaying said pulsed signals for time periods corresponding to the width of said pulsed signals; and means for combining selected delayed pulsed signals with the provided pulsed signals to form a composite pulsed signal having the desired pulse width.

* * * * *